US009230398B2

(12) United States Patent
Chun (10) Patent No.: US 9,230,398 B2
(45) Date of Patent: Jan. 5, 2016

(54) WIDE AREA TABLE GAMING SYSTEM (71) Applicant: FRESH IDEA GLOBAL LIMITED, Hong Kong (HK)

(72) Inventor: Jay Chun, Hong Kong (HK)

(73) Assignee: Fresh Idea Global Limited, Hong Kong (HK)

( * ) Notice: Subject to any disclaimer, the term of this patent is extended or adjusted under 35 U.S.C. 154(b) by 0 days.

(21) Appl. No.: 14/197,683

(22) Filed: Mar. 5, 2014

(65) Prior Publication Data

US 2014/0274253 A1 Sep. 18, 2014

Related U.S. Application Data (63) Continuation of application No. 13/844,617, filed on Mar. 15, 2013, now abandoned.

(51) Int. Cl.
*A63F 9/24* (2006.01)
*G07F 17/32* (2006.01)
(Continued)

(52) U.S. Cl.
CPC ............ *G07F 17/3225* (2013.01); *A63F 13/30* (2013.01); *G07F 17/322* (2013.01); *G07F 17/3218* (2013.01); *G07F 17/3223* (2013.01); *G07F 17/3262* (2013.01); *A63F 2003/00164* (2013.01); *G07F 17/32* (2013.01); *G07F 17/3272* (2013.01); *G07F 17/3293* (2013.01)

(58) Field of Classification Search
CPC .............. G07F 17/3218; G07F 17/322; G07F 17/3262; G07F 17/3272; G07F 17/3225; G07F 17/32; G07F 17/3293; G07F 17/3223; G07F 17/3251; G07F 2203/04808; A63F 1/00; A63F 13/12; A63F 13/00

USPC ....................................... 463/9–13, 29, 40–43
See application file for complete search history.

(56) References Cited

U.S. PATENT DOCUMENTS 5,083,271 A 1/1992 Thacher et al.
5,347,061 A 9/1994 Harandi et al.
(Continued)

FOREIGN PATENT DOCUMENTS

EP 1939826 A2 7/2008

OTHER PUBLICATIONS

Office Action for U.S. Appl. No. 13/948,101, mailed Dec. 16, 2013.
(Continued)

*Primary Examiner* — Justin Myhr
(74) *Attorney, Agent, or Firm* — Downey Brand LLP (57) ABSTRACT

An electronic gaming table adapted to host table games involving wagers includes a physical surface adapted for the play of live table games that include live players and the use of a live dealer and physical game components, multiple player terminals having separate processors, a master table controller in communication with each of the player terminal processors and adapted to control a plurality of electronic gaming table functions, and at least one interface in communication with the master table controller and one or more additional electronic gaming tables remotely located from the electronic gaming table. Each player terminal allows for a live player stationed thereat to participate in a first live table game directly at the electronic gaming table and also a second live table game remotely at a remotely located table. The first and second live table games can be different games, and can be played simultaneously.

18 Claims, 7 Drawing Sheets

(51) Int. Cl.
*A63F 13/30* (2014.01)
*A63F 3/00* (2006.01)

(56) References Cited

U.S. PATENT DOCUMENTS

| | | | |
|---|---|---|---|
| 5,472,194 A | 12/1995 | Breeding et al. | |
| 5,605,334 A | 2/1997 | McCrea | |
| 5,768,382 A | 6/1998 | Schneier et al. | |
| 5,851,011 A | 12/1998 | Lott | |
| 5,917,725 A | 6/1999 | Thacher et al. | |
| 5,970,143 A | 10/1999 | Schneier et al. | |
| 6,165,069 A | 12/2000 | Sines et al. | |
| 6,331,148 B1 | 12/2001 | Krause | |
| 6,508,709 B1 | 1/2003 | Karmarkar | |
| 6,547,246 B2* | 4/2003 | Webb | 273/292 |
| 6,671,358 B1 | 12/2003 | Seidman et al. | |
| 6,886,829 B2 | 5/2005 | Hessing et al. | |
| 6,991,544 B2 | 1/2006 | Soltys et al. | |
| 7,008,322 B1 | 3/2006 | Suzuki et al. | |
| 7,040,982 B1 | 5/2006 | Jarvis | |
| 7,206,762 B2 | 4/2007 | Sireau | |
| 7,233,922 B2 | 6/2007 | Asher | |
| 7,566,268 B2 | 7/2009 | Asher | |
| 7,566,270 B2 | 7/2009 | Amaitis | |
| 7,604,537 B2 | 10/2009 | Amaitis | |
| 7,637,506 B2 | 12/2009 | Naicker | |
| 7,684,874 B2 | 3/2010 | Schlottmann et al. | |
| 7,690,996 B2 | 4/2010 | Iddings et al. | |
| 7,711,628 B2 | 5/2010 | Davie | |
| 7,727,060 B2 | 6/2010 | Mills | |
| 7,731,586 B2 | 6/2010 | Letovsky et al. | |
| 7,783,542 B2 | 8/2010 | Horowitz | |
| 7,783,552 B2 | 8/2010 | Assia | |
| 7,798,895 B2 | 9/2010 | Jubinville et al. | |
| 8,052,526 B2 | 11/2011 | Abbott et al. | |
| 8,070,583 B2 | 12/2011 | Baerlocher et al. | |
| 8,150,157 B2 | 4/2012 | Downs et al. | |
| 8,262,090 B2 | 9/2012 | Soltys et al. | |
| 8,282,489 B2 | 10/2012 | Azerina et al. | |
| 8,469,788 B2 | 6/2013 | Carpenter et al. | |
| 2002/0094869 A1 | 7/2002 | Harkham | |
| 2002/0147042 A1 | 10/2002 | Shinners et al. | |
| 2002/0151366 A1 | 10/2002 | Walker et al. | |
| 2003/0137110 A1 | 7/2003 | Huard et al. | |
| 2003/0195841 A1 | 10/2003 | Ginsberg | |
| 2004/0121839 A1 | 6/2004 | Webb | |
| 2004/0204232 A1 | 10/2004 | Asher | |
| 2005/0043094 A1 | 2/2005 | Nguyen et al. | |
| 2005/0165669 A1 | 7/2005 | Montanaro | |
| 2005/0197938 A1 | 9/2005 | Davie | |
| 2005/0197948 A1 | 9/2005 | Davie | |
| 2006/0058082 A1 | 3/2006 | Crawford et al. | |
| 2006/0058083 A1 | 3/2006 | Crawford et al. | |
| 2006/0058084 A1 | 3/2006 | Crawford et al. | |
| 2006/0058085 A1 | 3/2006 | White et al. | |
| 2006/0058086 A1 | 3/2006 | White et al. | |
| 2006/0058087 A1 | 3/2006 | White et al. | |
| 2006/0058088 A1 | 3/2006 | Crawford et al. | |
| 2006/0058089 A1 | 3/2006 | White et al. | |
| 2006/0058090 A1 | 3/2006 | Crawford et al. | |
| 2006/0058091 A1 | 3/2006 | Crawford et al. | |
| 2006/0058092 A1 | 3/2006 | Crawford et al. | |
| 2006/0058093 A1 | 3/2006 | White et al. | |
| 2006/0066052 A1 | 3/2006 | White et al. | |
| 2006/0068498 A1 | 3/2006 | White et al. | |
| 2006/0068864 A1 | 3/2006 | White et al. | |
| 2006/0068865 A1 | 3/2006 | White et al. | |
| 2006/0068866 A1 | 3/2006 | White et al. | |
| 2006/0068868 A1 | 3/2006 | Crawford et al. | |
| 2006/0068869 A1 | 3/2006 | White et al. | |
| 2006/0068870 A1 | 3/2006 | Crawford et al. | |
| 2006/0068871 A1 | 3/2006 | Crawford et al. | |
| 2006/0068879 A1 | 3/2006 | Crawford et al. | |
| 2006/0068899 A1 | 3/2006 | White et al. | |
| 2006/0100019 A1 | 5/2006 | Hornik et al. | |
| 2006/0105839 A1 | 5/2006 | Graeve | |
| 2006/0217199 A1 | 9/2006 | Adcox et al. | |
| 2006/0264252 A1 | 11/2006 | White et al. | |
| 2006/0287066 A1 | 12/2006 | Crawford et al. | |
| 2006/0287067 A1 | 12/2006 | White et al. | |
| 2006/0287101 A1 | 12/2006 | Crawford et al. | |
| 2006/0287102 A1 | 12/2006 | White et al. | |
| 2006/0287103 A1 | 12/2006 | Crawford et al. | |
| 2006/0287104 A1 | 12/2006 | White et al. | |
| 2007/0015583 A1 | 1/2007 | Tran | |
| 2007/0129138 A1 | 6/2007 | Amaitis | |
| 2007/0178955 A1 | 8/2007 | Mills | |
| 2007/0259709 A1 | 11/2007 | Kelly et al. | |
| 2008/0045344 A1 | 2/2008 | Schlottmann et al. | |
| 2008/0081685 A1 | 4/2008 | Naftaly | |
| 2008/0108404 A1 | 5/2008 | Iddings et al. | |
| 2008/0113767 A1 | 5/2008 | Nguyen et al. | |
| 2008/0200242 A1 | 8/2008 | Ginsberg | |
| 2008/0248849 A1* | 10/2008 | Lutnick et al. | 463/16 |
| 2009/0124323 A1 | 5/2009 | Dunn et al. | |
| 2009/0131151 A1 | 5/2009 | Harris et al. | |
| 2009/0176549 A1* | 7/2009 | Saig et al. | 463/17 |
| 2009/0280904 A1 | 11/2009 | Nicely et al. | |
| 2009/0325686 A1* | 12/2009 | Davis et al. | 463/25 |
| 2010/0035679 A1* | 2/2010 | Oram | 463/25 |
| 2010/0105460 A1* | 4/2010 | Makhoul et al. | 463/13 |
| 2010/0311502 A1* | 12/2010 | Miller et al. | 463/30 |
| 2011/0275432 A1* | 11/2011 | Lutnick et al. | 463/25 |
| 2011/0294561 A1 | 12/2011 | Shaw et al. | |
| 2012/0049455 A1* | 3/2012 | Yap et al. | 273/274 |
| 2012/0083909 A1 | 4/2012 | Carpenter et al. | |
| 2012/0214575 A1 | 8/2012 | Amaitis et al. | |
| 2012/0252564 A1* | 10/2012 | Moore et al. | 463/25 |
| 2012/0329551 A1 | 12/2012 | Arerina et al. | |
| 2013/0005456 A1* | 1/2013 | Okujo et al. | 463/30 |
| 2013/0079147 A1* | 3/2013 | Merati | 463/42 |
| 2013/0116031 A1 | 5/2013 | Carpenter et al. | |
| 2013/0225276 A1 | 8/2013 | Au-Yeung | |
| 2013/0244765 A1 | 9/2013 | Arnone et al. | |
| 2013/0281197 A1 | 10/2013 | Carpenter et al. | |
| 2013/0288764 A1 | 10/2013 | Chun | |
| 2013/0288779 A1 | 10/2013 | Chun | |
| 2013/0296031 A1 | 11/2013 | Arnone et al. | |
| 2014/0274252 A1 | 9/2014 | Chun | |

OTHER PUBLICATIONS

Cantor Fitzgerald Hopes to Bring Spread Betting to Las Vegas Casinos, Dec. 14, 2009.
Finanical Spread Betting, Apr. 26, 2012.
High-Speed Traders Set Their Sights on Asia and Latin America, Aug. 12, 2010.
Office Action for U.S. Appl. No. 13/456,110, mailed Jun. 11, 2013.
Final Office Action for U.S. Appl. No. 13/456,110, mailed Dec. 24, 2013.
Office Action for U.S. Appl. No. 14/017,071, mailed Nov. 7, 2013.
Notice of Allowance for U.S. Appl. No. 14/017,071, mailed Jan. 24, 2014.
Office Action for U.S. Appl. No. 14/017,073, mailed Dec. 10, 2013.
Final Office Action for U.S. Appl. No. 13/948,101, mailed Apr. 23, 2014.
Notice of Allowance for U.S. Appl. No. 14/017,073, mailed May 20, 2014.
Office Action for U.S. Appl. No. 14/095,882, mailed Aug. 14, 2014.
Office Action for U.S. Appl. No. 13/456,110, mailed Sep. 12, 2014.
Office Action for U.S. Appl. No. 13/542,446, mailed Sep. 10, 2014.
"Industry Research: ETGs in Asia update; more profitable than live tables", Union Gaming Research Macau; dated Apr. 29, 2013, p. 1-20.
Kate O'Keeffe, "The Cheapest, Richest Casino in Macau", The Wall Street Journal article dated Feb. 5, 2014 http://www.wsj.com/articles/SB10001424052702303743604579352783979643194.

* cited by examiner

FIG. 7 ic gaming table and also a
WIDE AREA TABLE GAMING SYSTEM

NOTICE OF RELATED APPLICATION

This application is a continuation of co-pending and commonly owned U.S. patent application Ser. No. 13/844,617, filed Mar. 15, 2013 and entitled "WIDE AREA GAMING TABLE SYSTEM," which application is incorporated herein in its entirety and for all purposes.

TECHNICAL FIELD

The present invention relates generally to gaming machines and systems, and more particularly to gaming tables having automated components.

BACKGROUND

Wagering games such as baccarat, blackjack, roulette, and various poker-based table games, among many others, are popular games offered in casinos and other similar establishments.

SUMMARY

It is an advantage of the present disclosure to provide improved gaming table systems, particularly with respect to those having the ability to allow players to participate in many live table games from remote locations. This can be accomplished at least in part through the use of electronic gaming tables adapted to host live games with live dealers and physical game components, where the various player terminals situated about the table allow a live player to participate in live table games at the table and also in live table games at another similar yet remotely located table in communication with the first table. Remote player terminals without a live game thereon that provide for such multiple table participation can also be included.

In various embodiments of the present disclosure, an electronic gaming table is adapted to host live table games involving wagers, table games based on the wagers, and monetary awards based on the results of the table games. The electronic gaming table can include a physical surface adapted for the play of live table games that include the use of a live dealer and physical game components, as well as a dealer station situated proximate the physical surface and adapted to provide for the presence of a live dealer who facilitates the play of the live table games. The gaming table can also include a plurality of player terminals situated proximate to and distributed about the physical surface, wherein each of the player terminals provides for the presence of a live player at the table and includes a player terminal processor coupled to a player interface having one or more player input devices and one or more player output devices. In addition, a master table controller can be in communication with each of the player terminal processors and adapted to control a plurality of electronic gaming table functions. Also, at least one interface can be in communication with the master table controller and adapted for communications with one or more additional electronic gaming tables remotely located from the electronic gaming table. At least one of the player terminals can adapted to allow a live player stationed thereat to participate in a first live table game at the electronic gaming table and also a second live table game at one of the additional remotely located electronic gaming tables.

In various detailed embodiments, the first live table game can be different than the second live table game. Also, the first live table game and second live table game can be played simultaneously. In some embodiments, the player input devices player output devices can include a camera and a video screen. The camera can be adapted to capture a gesture of the live player, convert the gesture to an equivalent game command, and associate the game command to the player position at the electronic gaming table. The camera can be situated proximate the physical surface, operatively coupled to the master table controller, and configured to collect information on live game play actions at the table. Such live game play actions can be associated with the physical game components, and can include, for example, shuffling cards, cutting a card deck, dealing cards, squeezing cards, game flow control gestures by the dealer and/or collecting used cards. Also, the camera can be adapted to transmit video of the game play actions to the remotely located electronic gaming table such that the video can be presented to players at the remotely located electronic gaming table.

One or more player terminals can include a touchscreen, buttons, bill acceptor, printer and/or card reader. In addition, the table can include an electronic shoe in communication with the master table controller, where the shoe can hold playing cards for the play of a live table game and be adapted to read the playing cards and communicate information therefor to the master table controller. The physical game components can include one or more playing cards, mechanical wheels rotatable about one axle, physical dice, monetary value chips, and/or banker or dealer buttons or tokens. In addition, the table can include at least one community display configured to display community information, situated proximate the physical surface and operatively coupled to the master table controller. Such community information can include previous game results, leader board rankings, wagering statistics, win-loss statistics, current jackpot amounts, bonusing status, and/or minimum wager requirements. In some embodiments, a player terminal can be adapted to conduct financial transactions between the live player and one or more remotely located network devices via the interface.

In further embodiments, an electronic gaming table system can include a plurality of electronic gaming tables such as any of those set forth above, as well as an electronic gaming table host server located remotely from and in communication with at least two of the electronic gaming tables, where the electronic gaming table host server is adapted to facilitate communications between the two electronic gaming tables. Similar to the foregoing, a first live table game at a first electronic gaming table can be different than a second live table game at a second electronic gaming table. Also, the first live table game and second live table game can be played simultaneously. In addition to the foregoing, the system can include a financial server in communication with each of the two electronic gaming tables, where the financial server is adapted to facilitate financial transactions from the two electronic gaming tables. In particular, one or more player terminals at the tables can be adapted to conduct financial transactions between a live player and the financial server.

In various detailed system embodiments, a plurality of remote player terminals can also be included. These remote player terminals can be located separately from all of the plurality of electronic gaming tables, and each of the remote player terminals can be adapted to allow a remote player not present at any of the electronic gaming tables to participate in a live table game at one of the electronic gaming tables and also another live table game at another of the electronic gaming tables. Each remote player terminal can include a processor that is operatively coupled to a player interface having one or more player input devices and one or more player output devices, the electronic gaming table host server, and a financial server in communication with the plurality of electronic gaming tables and the plurality of remote player terminals. The financial server can be adapted to facilitate financial transactions between the plurality of electronic gaming tables and the plurality of remote player terminals.

In still further embodiments, various methods of providing live table games at a gaming table are provided. Pertinent method steps can include providing a first electronic gaming table adapted to host table games involving wagers, table games based on the wagers, and monetary awards based on the results of the table games, establishing a communication connection between the first electronic gaming table and a remotely located second electronic gaming table also adapted to host table games involving wagers, table games based on the wagers, and monetary awards based on the results of the table games, presenting a first live table game involving a live dealer at the first electronic gaming table, wherein a live player located at the first electronic gaming table participates in the first live table game, presenting a second live table game at the second electronic gaming table, displaying a live feed of at least a portion of the second live table game at the first electronic gaming table, wherein the live player participates in the second live table game while being located at the first electronic gaming table, and awarding a prize or monetary payout to the live player based on the outcome of the first live table game, the second live table game, or both. Such methods can be conducted with one or more electronic gaming tables from those set forth above. In various embodiments, the live feed comprises a video feed. Again, the first live table game and the second live table game can be played simultaneously. Also the first live table game can be different than the second live table game. Other details from the single table and system embodiments above can also apply to the various detailed method embodiments.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed inventive apparatuses and methods for wide area gaming tables and systems. These drawings in no way limit any changes in form and detail that may be made to the disclosure by one skilled in the art without departing from the spirit and scope of the disclosure.

DETAILED DESCRIPTION

Exemplary applications of apparatuses and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to systems and methods for providing, conducting and facilitating the play of multiple wagering games at live electronic gaming tables that can include live dealers, live players, live gaming components, and an electronic platform. This disclosure may be applied to any live table game, such as baccarat, blackjack, roulette, craps, pai gow, sic bo, bingo, card games, and the like, as well as any other type of game having a live or electronic dealer and one or more players seated at a gaming table or electronic gaming platform. The various embodiments disclosed herein can be applied with respect to individual tables, entire systems, and methods of running table games.

As discussed herein, this disclosure may also be applied in a live electronic gaming table system that monitors a live table game in which physical or virtual cards are dealt to one or more players at a gaming table, or other gaming elements are employed such as dice, and collects the randomly generated game play data. The game play data collected is used to enable play of the same live table game remotely through gaming terminals. The gaming terminals may be any platform capable of receiving and transmitting data, including "thin-client" platforms or platforms which do not process game play data and "smart" platforms or platforms which process game play data. The gaming terminal maybe stationary, similar to the slot machines or electronic tables commonly seen at the physical casino, or maybe portable electronic devices such as smart phones, computer tablets, portable media players, laptop computers, desktop computers, smart TV, and the like. Additionally, the gaming network they attach to can be of wired (Ethernet, Token Ring, Serial multidrop, etc.) or wireless variety (802.11x, BlueTooth, LTE, 2G/3G/4G cellular, Zigbee, Ultra Wide Band, etc.) known in the art. Thus, players interested in placing wagers on a live-table games are not confined to the gaming table or casino floor.

In general, the present disclosure pertains to a system of electronic gaming tables that allows any participating player on one table to also play on multiple other electronic gaming tables at the same time. In addition, the system also allows remote player terminals to participate as if the remote player has a seat at the physical table. A relevant electronic gaming table system can include live electronic tables ("eTables"), remote game terminals (electronic gaming machine ("EGM"), smart phone, smart TV, tablet, etc.), a central games repository and server that acquires the available live games from each eTable, indexes them and broadcasts the games and games history to other electronic tables, remote game terminals, and remote gaming sites, a multi-site games traffic server that receives remote game requests, verifies a player's eligibility (location, ID, funds), enforces jurisdictional rules, and routes eligible bets to the player's requested game "channel" being broadcasted, a financial server that acts as a Central Clearinghouse for remote wagers, and a network that connects the electronic tables, remote game terminals, the games repository and router, and the financial clearinghouse server. Other components and items may also be present as desired.

In addition to the various components, details and other aspects set forth herein with respect to the disclosed wide area gaming table systems and remote gaming in general, further details and explanations regarding remote gaming and table game systems can be found at, for example, U.S. patent application Ser. Nos. 13/893,340; 13/542,446; 13/456,110; 13/042,633; 11/497,708; 111312,150; 11/198,218; and 111042,732, with the entire contents of all of these applications being incorporated herein by reference in their entireties and for all purposes.

Figure 1A:
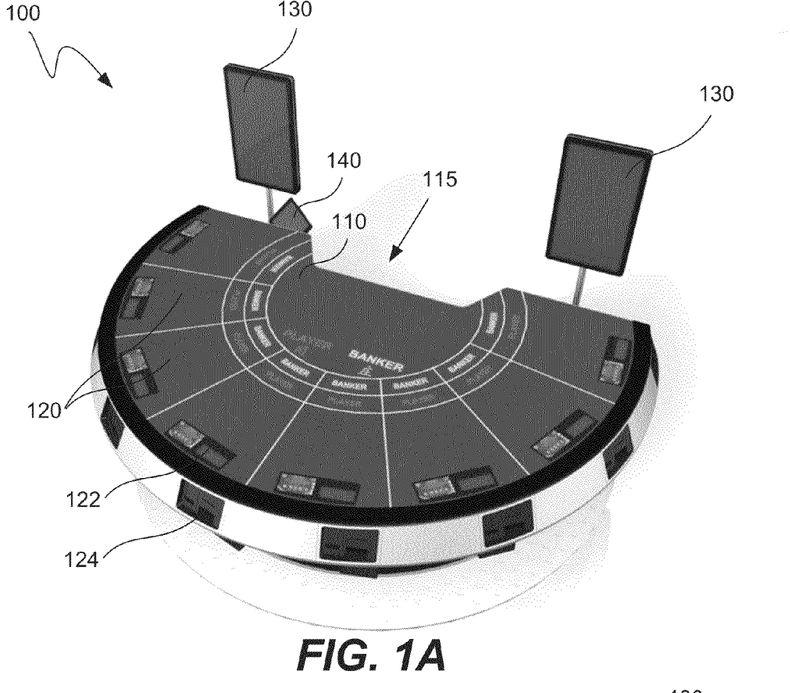
FIGS. 1A and 1B illustrate in top and front perspective views an exemplary electronic gaming table adapted for use in a wide area gaming table system according to one embodiment of the present disclosure.
Figure 1B:
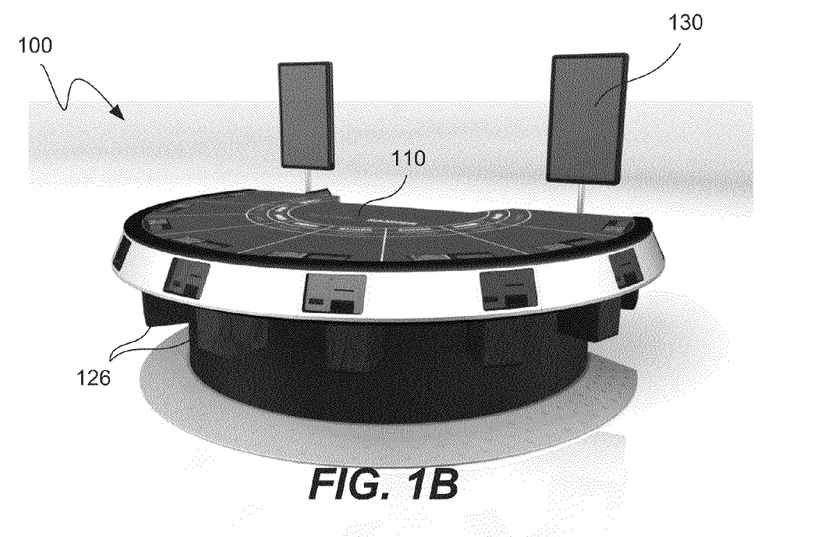

Referring first to FIGS. 1A and 1B, an exemplary electronic gaming table adapted for use in a wide area gaming table system according to one embodiment of the present disclosure is illustrated in top and front perspective views respectively. Electronic gaming table ("eTable") 100 can include a playing surface 110 adapted for the play of live table games using live physical components, a live dealer station or region 115, a plurality of player stations 120, each of which has its own displays 122, bill acceptor, card acceptor and other input components 124, one or more community displays 130, and a dealer station display and/or computing device 140. One or more physical separators 126 may separate the different player stations 120.

Each player position 120 around the eTable 100 can have a player terminal integrated into it. Like a standalone remote gaming terminal, each player terminal can have its own controller, buttons, touchscreen display, bill validator, printer, card reader, and so forth. The player terminals can be connected to a master table controller ("MTC") for the entire table via a switchlhub, and the MTC connects to an overall local or wide area network, as provided in greater detail below.

Each eTable 100 can be hosted by a live dealer, such as at a dealer station 115. The live dealer deals real cards and/or uses real dice or other physical game components, which can be done on a wooden green-felt table surface 110. The cards can be drawn from an electronic shoe ("eShoe"), which is connected to the MTC on the local table network. In some embodiments, the eShoe scans the cards and reads the rank and suits for each card removed. The MTC, via player login data (such as player tracking card swipe or a cash insertion at the bill acceptor), knows which positions at the table are active and thus can monitor the progress of a game. One or more table sensors, such as a camera, RFID reader, or the like, can be used to capture video of the dealer action for broadcasting, as well as tracking of players and physical game components through a variety of means. The camera can also be used to further verify and keep a log of game activities, such as, for example, cards removed from the eShoe, cards dealt to player positions, bets entered, new players, and the like.

The eTable 100 also has one or more displays. In one embodiment, there can be one or more community displays 130 to show common player information, such as community cards, table wager minimum, casino name, time, advertisement, and the like. Game history (e.g., baccarat roadmaps) may also be displayed on the same screen 130 or on a separate screen attached to the eTable 100. The eTable may also have discrete displays such as On/Off/Flashing lights mounted underneath table graphics to annunciate game information such as Banker Win, Player Win, New Game, No More Bets, and so forth. Such table screens and discrete displays can be driven by the MTC.

Unlike other electronic gaming tables where each player terminal is only configured to receive and to interact with one live game occurring at the table itself, one or more of player terminals 120 are configured to allow participation in the live game at the eTable 100, as well as participation at other live games at other eTables in communication with eTable 100. Such participation in local and remote live games can happen simultaneously. Further, the local games need not be the same as the remote games. For example, a live player at eTable 100 could be playing blackjack live with real cards, chips, and the like at his or her player station 120, while also playing roulette or craps at a remotely located eTable via the display 122 and associated input and output components at the player station.

Thus, the player interface 122 at each player station 120 on eTable 100 can be designed to toggle between local interactions (e.g., play options with the live game at the local eTable) and remote interactions (e.g., placing bets at other eTables). The player interface can be adapted to switch between games, or can be adapted to present multiple local and remote games at the same time. Switches can depend on the context of the game and whether it is important for concurrent play at the table. For example, a local baccarat interface may have touchscreen options for bets on Player, Dealer, and a Tie, but a remote blackjack game interface simultaneously being played may have screen buttons for Bet, Insurance, Double Down, Split, and the like.

Figure 2A:
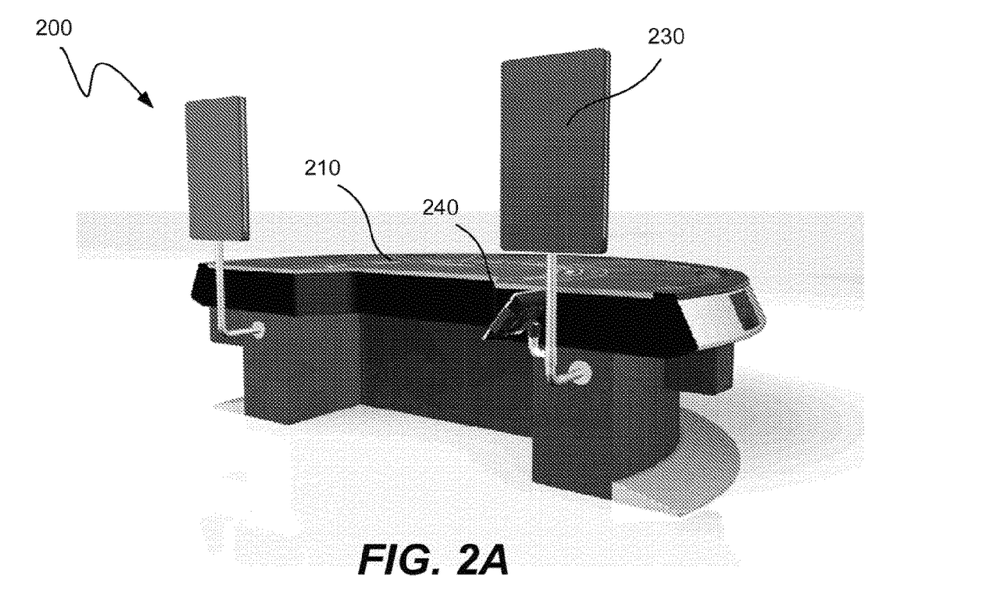
FIG. 2A illustrates in rear perspective view the exemplary gaming table of FIGS. 1A and 1B according to one embodiment of the present disclosure.
Figure 2B:
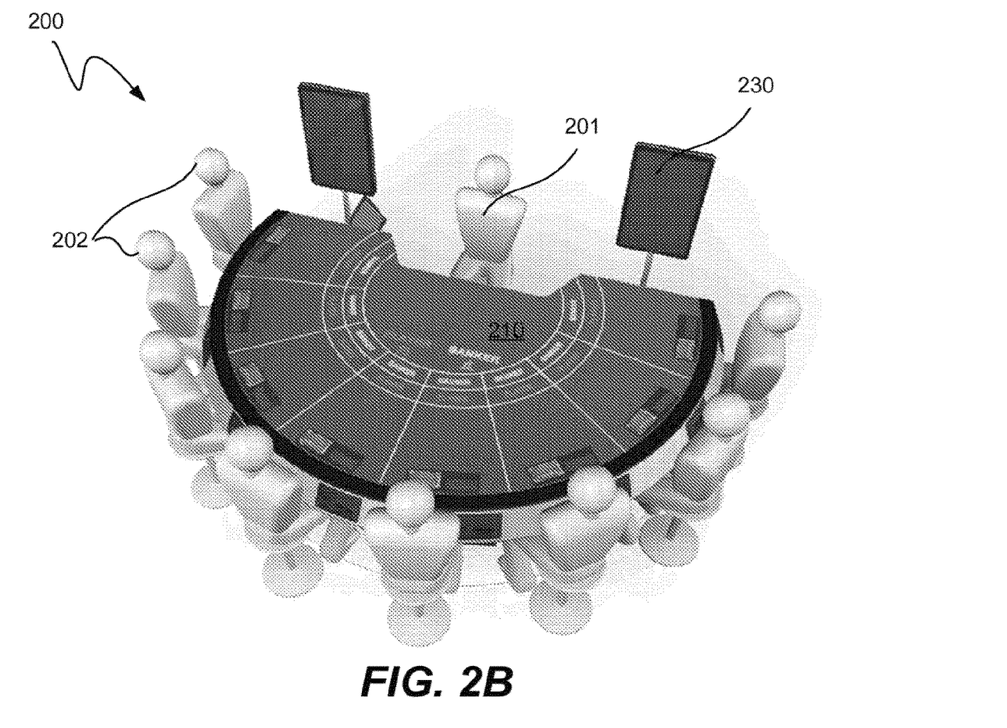
FIG. 2B illustrates in top perspective view an exemplary gaming table similar to that of FIGS. 1A and 1B an having a live dealer and live players situated thereat according to one embodiment of the present disclosure.

Continuing with FIG. 2A an exemplary gaming table similar to that of FIGS. 1A and 2B is shown in rear perspective view. eTable 200 can have a dealer station in back situated proximate a table playing surface 210, one or more community displays 230, and a dealer computer, display or terminal 240 at the dealer station. FIG. 2B illustrates in top perspective view an exemplary gaming table similar to that of FIGS. 1A, 1B and 2A, while having a live dealer and live players situated thereat. Again, eTable 200 has a playing surface 210 and community displays 230, among other pertinent items. A dealer 201 and numerous players 202 can be seated or otherwise situated proximate the playing surface of the table.

Figure 2C:
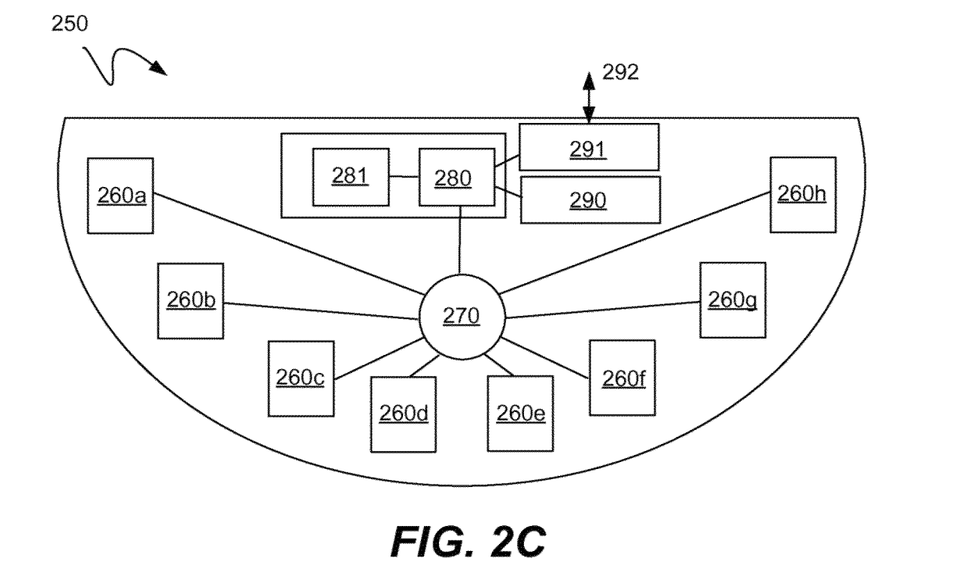
FIG. 2C illustrates in block diagram format an exemplary computing system for an electronic gaming table adapted for use in a wide area gaming table system according to one embodiment of the present disclosure.

Turning next to FIG. 2C an exemplary computing system for an electronic gaming table adapted for use in a wide area gaming table system is provided in block diagram format. Computing system 250 for an eTable can include various individual processors and peripherals 260a-260h for a plurality of player stations. In various embodiments, each of these separate items can be an identical or substantially similar set of processors, displays, inputs and other components, as may be desirable for each separate player station. All of the player station systems 260a-260h can couple to a central router or hub 270, which is coupled to a master table controller ("MTC") having a CPU 280 and memory or storage 281. The MTC can be coupled to various table displays 290, as well as an interface 291 for outside communications. Link 292 represents the connection to the network, so that system 250 is able to communicate with various other network or system components.

Figure 3:
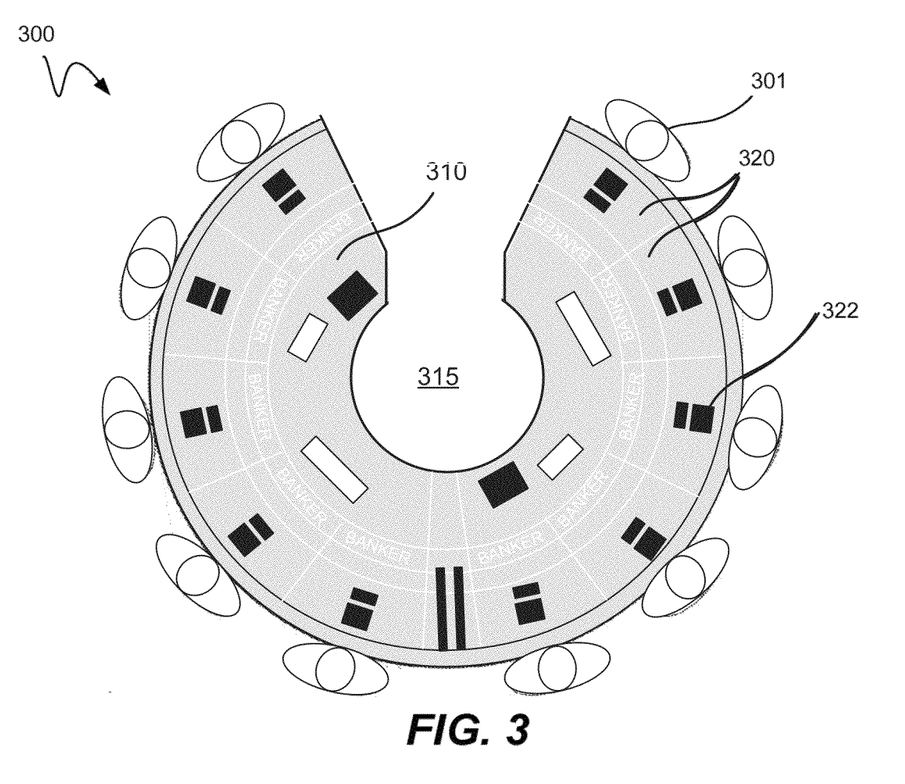
FIG. 3 illustrates in top plan view an exemplary overhead layout for an alternative electronic gaming table adapted for use in a wide area gaming table system according to one embodiment of the present disclosure.

One example of an overhead layout for an alternative electronic gaming table adapted for use in a wide area gaming table system is provided in FIG. 3. As shown, eTable 300 can be adapted for a different style game having different sets of rules. eTable 300 can have a playing surface 310 and a dealer station 315. Also, a plurality of players 301 can be distributed about the table at various player stations 320, each of which can have its own display 322 and other individual components, as in the forgoing embodiments. Moving now to FIG. 4 an exemplary wide area electronic gaming table system according to one embodiment of the present disclosure is illustrated in block diagram format. Wide area system 400 can include a wide variety of components and items, such as a bank 410, a games router 420, and a financial clearinghouse 430. A cloud 450 or network can couple these items to various eTables, terminals, game servers, casinos, and other distributed components. One or more personal devices 440 can serve as remote player terminals in some embodiments. Various networked casinos, game servers, eTables 460 and other remote terminals 470 can also be coupled through the cloud 450 or network in system 400.

Figure 4:
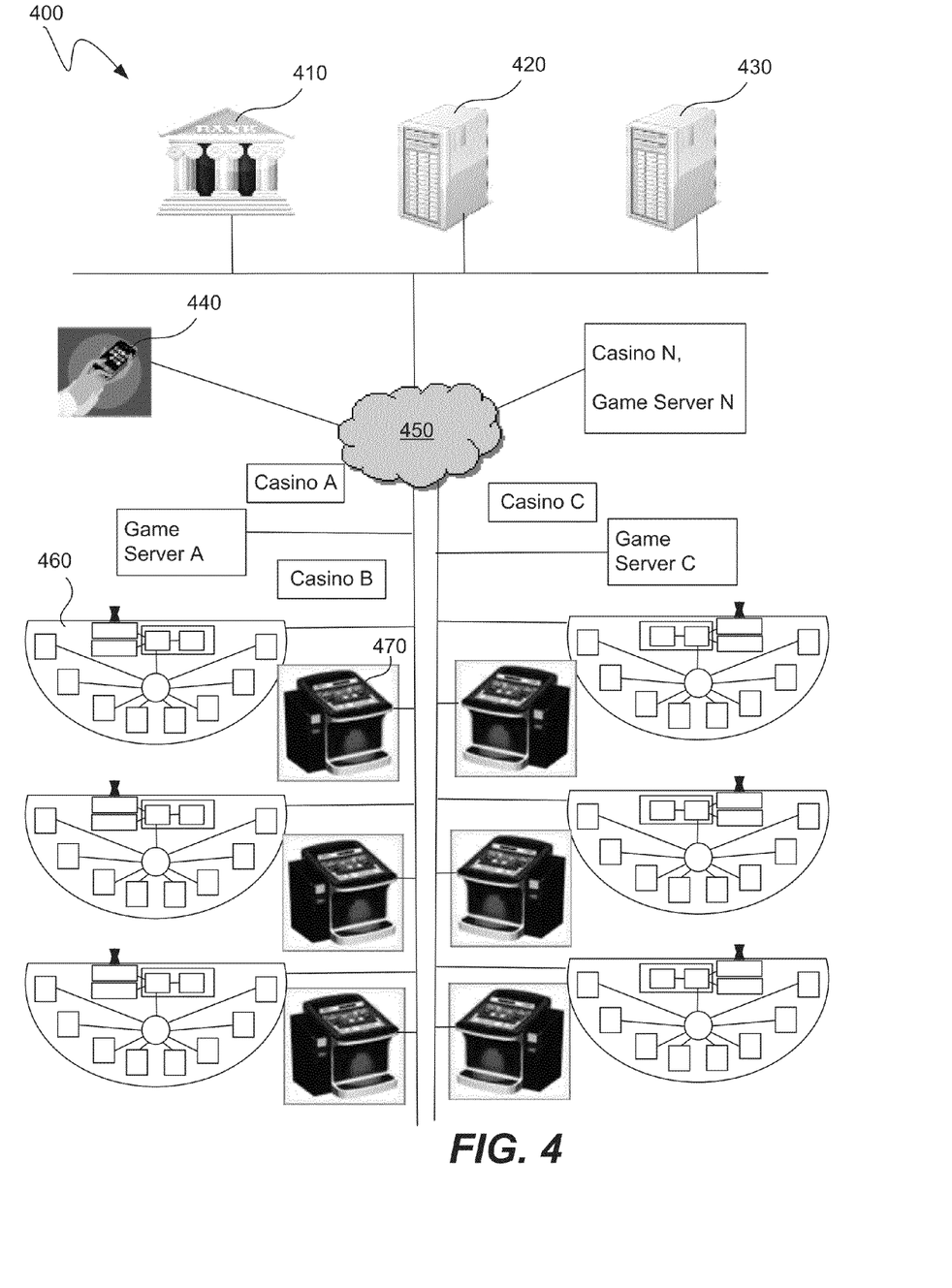
FIG. 4 illustrates in block diagram format an exemplary wide area electronic gaming table system according to one embodiment of the present disclosure.

One or more game servers may be present in system 400, and each operates in a particular manner to facilitate the play of remote table games. In particular, a game server collects live game information from each eTable, applies game rules, and returns game results. Beside monitoring and controlling the games, the game server also keeps track, in a database, of game history of each eTable, accounting information, revenue reports, maintenance information, and the like. Each of these individual functions can be performed by a separate application on a separate server, or integrated into one application running on one comprehensive server. The determination of one or multiple servers and applications depends on the number of eTables, game stations, remote gaming terminals, both local and remote, that are being connected across the system.

Each separate casino or gaming establishment can have its own one or more game servers, and each game server can be configured to serve a particular game type (e.g., baccarat, blackjack, roulette, craps, and the like), a quantity of tables or game stations, or an area of the casino. In a multi-game, multi-site environment, one important function of the game server is the handling of financial transaction from remote game terminals. In prior arts, remote game terminals are logged into a particular eTable. From there, the remote player either participate directly as if he is sitting at the table, or back bet on one of the players at the table. In system 400, however, a remote player need not be constrained to any particular physical eTable. For instance, a player sitting at a seat on a local eTable can wager on the game on going at the local table and at another table at the same casino, or at an eTable at a casino located elsewhere. These capabilities are enabled by a network of game servers, one or more games routers 420, and a central financial clearinghouse 430 for remote wagers.

Another important function performed by each game server across multiple establishments is the push of live game information to the game server to be broadcasted to remote gaming terminals. Here, the game server can reconstruct a live physical game in a number of ways, such as by mashing up live video feeds of the game being played at the local eTable, the digital rendition of the game pieces (cards, dice, roulette wheel, etc.), the bet options (bet board), and the like, into a composite video stream and/or digital presentation for broadcasting. In short, the live game at the eTable can be broadcast to other gaming sites like TV channels being broadcast by cable TV system to eligible subscribers. Utilizing such a design, and in separating the game presentation from the bet actions, allows many remote devices to participate in a given live table game. Again, such devices can include a remote EGM, smart phone, tablet computer, laptop, smart TV, and the like.

A games router 420 can be a match maker between a given live eTable and a remote bettor or player. In operation, games router 420 receives search requests from the various remote game stations, matches up the search requests with the available live table games in its database, and directs the multitude of live game broadcasts to their requestors and subscribers. Again, such requests for remote play can come from remote EGMs, remote terminals, remote mobile devices, remote eTable players, and so forth. The games router 420 also monitors its subscriber-base for remote wagers from the subscribers. When a remote wager is received, the games router 420 verifies the eligibility of the wager prior to allowing the remote EGM to make a wager. Such verification can be based on EGM location, rules related to that location, player ID, funds available, and other relevant criteria. Once a remote wager is accepted at the eTable, the games router notifies the financial clearinghouse, which in turn handles the wager settlement based upon the game outcome. Then the local game server that services the remote EGM is notified, such that proper revenue accounting can take place, along with an audit trail for account reconciliations and/or dispute resolutions if that becomes necessary. Games router 420 can also handle notifications to remote players regarding wins, losses, account values, and the like.

Like the financial clearinghouse of a stock market, the financial clearinghouse ("FeR") 430 can be a centralized entity that keeps track of all of the remote wagers and all of the eTable(s) and remote terminals involved. At the end of each game at each eTable, the FeR 430 settles all accounts by crediting or debiting them. Such accounts can include each live player account, each remote player account, an overall eTable account, and any other pertinent account that requires resolution. FeR 430 receives remote bets from the games router 420 and the game results (e.g., win/loss, and pay table information) from the local games server for the particular eTable 460 involved in a given game. In one embodiment, a player account can be pre-established with the FeR 430, and the FeR can credit the player account directly at the casino where he or she is playing, or at his Bank 410, if that has been arranged. In another approach, the FeR 430 sends the settlement funds directly to the player station, EGM or remote terminal where the player is actually located. This can be a preferred approach for cash players, for example.

In various embodiments, remote gaming terminals 470 can be fully robust or even thin client gaming terminals that are allowed to participate in live games remotely from eTables in the overall system. As in the case of player stations at the eTables, the remote gaming terminals can be adapted to play in multiple live games, which can be done simultaneously and where the games are different from each other. A remote game terminal 470 can be similar to a video slot machine, with all the typical peripheral devices attached such as a coin or bill acceptor, display, player tracking card reader, printer, and the like. The main difference is that it is remotely located from the live table game, is connected to the eTable system network, and receives its live game feed from a game router.

A remote gaming terminal 470 may be provided as a kiosk, an interface at an electronic gaming device or eTable, a handheld device, cellular phone, tablet, smart TV, or other device networked (locally or via the Internet, for example) to the overall system 400. A data communication device may be positioned at a gaming table and configured for receiving game play data randomly generated during play of the live table game, either through manual input or automatic input of game play information, such as the gaming symbols on the cards dealt, to the communication device. The communication device can be a PDA or smart phone 440, for example. Such a device can be at a live eTable, or can be a remote gaming terminal separate from all system eTables, similar to terminals 470.

In various embodiments, game play information may be manually input to data communication device through a manual input device such as a keypad or touchscreen. Alternatively, electronic scanning, recognition and detecting devices known in the art may be used to read cards, determine the location of a roulette ball, or ascertain the results of a dice game, and then automatically transmit the information via communication device. Game play information may also be automatically input using a camera mounted over the live table game to obtain game information, or through one or more card reading devices, such as an optical reader mounted in a gaming table, card delivery shoe, or card shuffler, which is capable of decoding the gaming symbols shown on physical playing cards. Alternatively, such as in electronic gaming platforms in which physical cards are replaced by virtual cards, the gaming data may derive from the random number generator used to generate random virtual cards.

The data communication device receives and transmits game play data, which can be live or randomly generated as a result of playing the live table game. Processing device facilitates comparing the game play data with the rules and/or criteria for winning the wagers stored in data storage device, and determining an outcome of the wagers placed on the live table game via a data communication device of gaming terminal 470. If the criteria are satisfied, then the wager is won, whereas if the criteria are not satisfied the wager is lost. A display device at the gaming terminal 470 can be configured to facilitate the entry of wagers, show a live multimedia feed of the table game being played and communicate the outcome of any wagers placed.

As one example, system 400 may be configured to provide the option for a player to enter remotely into a live conventional blackjack game through an eTable 460 or remote gaming terminal 470. A player using gaming terminal 470 may choose to participate in the live blackjack game or play another remote blackjack game in which the rules are different, such as the rules for dealing cards to reveal their value, or rules relating to the wager size (minimum, maximum, increment), or rules relating to payout associated with game symbols and symbol combinations, or rules allowing for a wild card, or in a blackjack variant in which the rules differ in any way from conventional blackjack. The cards dealt in the live game can be correlated by system 400 with the cards to be received in the remote wagering game according to its rules in order to resolve all wagers placed in the remote wagering game.

System 400 may be configured to be responsive to an additional request for randomly generated game play data, which may be necessary for resolving a remote wagering game played by a remote player. For example, system 400 may inform the dealer at the live table game through a communication device or display 140 to continue to deal a certain number of randomly shuffled cards above the amount needed to resolve the live table game, or system 400 may be in communication with a random number generator for the purpose of generating any amount of random gaming symbols necessary to match the amount necessary in the remote wagering game or add on to the random gaming symbols acquired from the live table game.

In another example, system 400 is configured to provide the option for a player to enter into a live conventional blackjack or playa remote blackjack game which includes one or more side wagers. Players may place the side wager through a player station at an eTable 460 or remote gaming terminal 470. Either live game component results and/or randomly generated gaming symbols received via a communication device can be compared via appropriate system processing, with criteria for determining the outcome of the side wager the determining whether the game outcome is favorable or negative. If favorable, then the side wager will be won and the player appropriately credited.

For example, a remote blackjack game may allow for the player to wager on receiving a hand that has achieved a poker rank such as a pair. The physically dealt cards and/or randomly generated gaming symbols dealt in the live conventional blackjack game are received and compared with the criteria that the gaming symbols corresponding to the player's hand in the remote blackjack game comprise two cards of the same rank. In yet another example, the game of baccarat may be played live and broadcast to player terminal 470, along with various remote baccarat variant games that include different rules, such as no-commission versions, variations on pay tables, or which include additional side wagers, which may include progressive side wagers, mystery jackpots or bonuses. Thus, players at a player station at an eTable 460 or remote gaming terminal 470 are capable of participating in many variations of baccarat games with the same hand delivered in the live table game.

Players may therefore have a variety of options to play other wagering games than the live table game. However, system 400 may be configured so that only the remote wagering games that rely on the same amount or plurality of gaming symbols, or game variations that belong to the same game families (variations of Baccarat, Roulette, Sic-Bo, and the like) as those gaming symbols which are physically determined and/or randomly generated in the live table game are offered as available to players through the actual eTable.

System 400 may be configured to provide a simulation of the remote wagering game wager on by players using a player station or remote gaming terminal. The simulation may be presented on a suitable display according to the rules of the remote wagering game and may take any form, such as a display of playing cards being dealt by a virtual dealer or the actual dealer in the live table game, which would enhance the overall player experience. System 400 may be configured to provide a new display or skin on a display device of a station or gaming terminal and provide customized playing cards for the remote wagering games to distinguish between games and provide proprietary information, among other things. Variations in game rules, wager size and pay tables affecting payout amounts and volatility that are different from that of the live table may also be applied to the games at the remote game terminals to provide a favorable personalized player experience.

Figure 5:
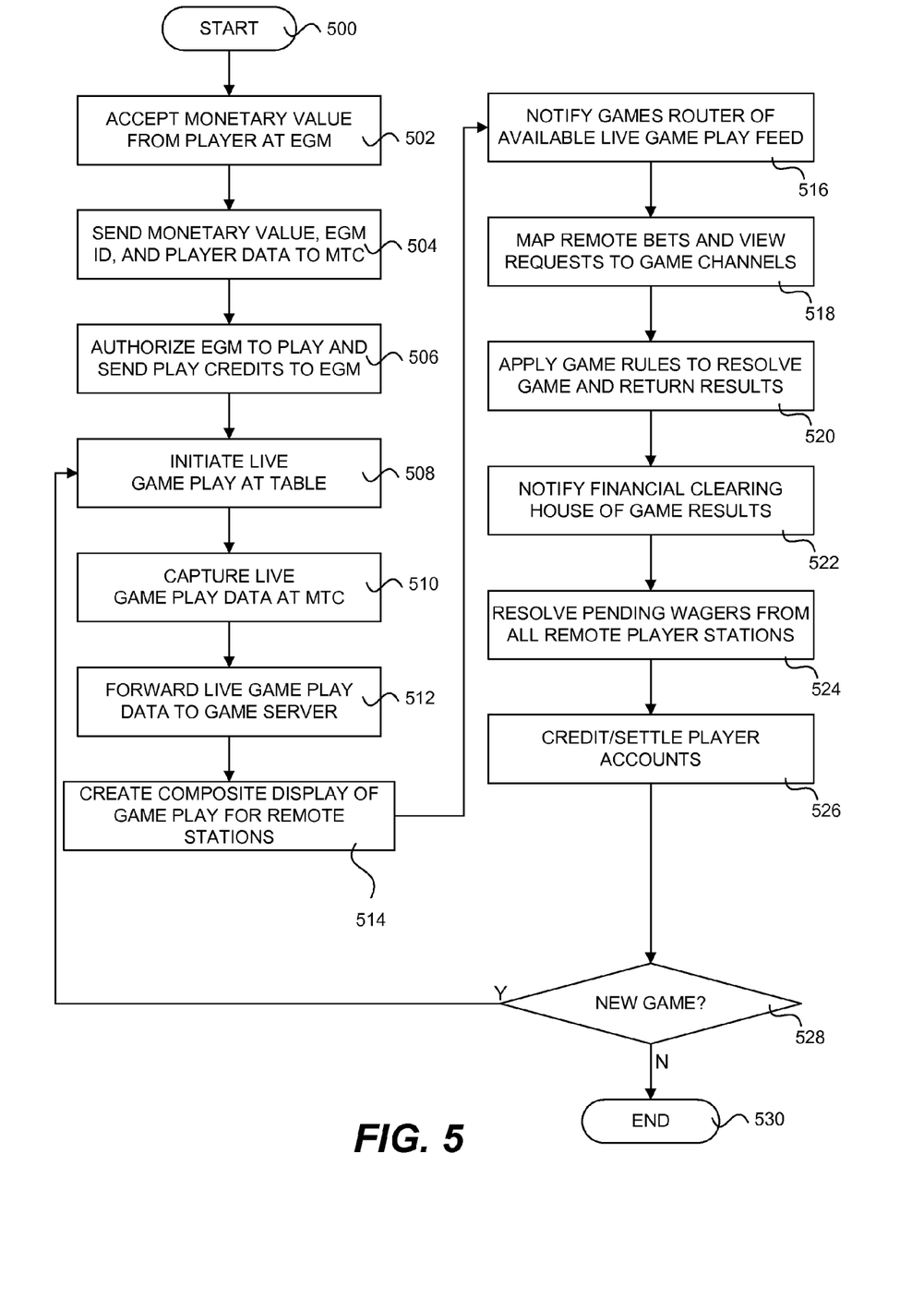
FIG. 5 provides a flowchart of an exemplary method of administering a live table game in a gaming table system having a game server, games router and financial clearinghouse according to one embodiment of the present disclosure.

FIG. 5 provides a flowchart of an exemplary method of administering a live table game in a gaming table system having a game server, games router and financial clearinghouse. After a start step 500, monetary value from a player is accepted by an EGM or other gaming terminal at process step 502. Again, this can be at a player station at an eTable, at a remote terminal, or at any remote playing device. The monetary value can be by way of coins, bills, cards, or other acceptable cash or valuable credit offered by the player. The monetary value is validated and sent to the MTC of the respective eTable for which a game is to be played at process step 504. In addition, the EGM or other station ID, player ID, and/or any other relevant data can also be sent to the MTC. The MTC can then authorize the EGM to play at process step 506, whereupon suitable game play credits are then sent to the EGM. Such monetary value and/or game play credits can be stored at the appropriate location.

At a following step 508, a live game play can be initiated at the eTable. This can be done by a live dealer starting to play a game with the appropriate physical components, which can be cards, dice, wheels, chips, tokens, and the like. The MTC at the eTable then captures the live game play data at process step 510, after which the live game play data is forwarded to the appropriate game server at process step 512. The game server can then store the appropriate game data and create a composite display of game play for the various remote gaming stations and other eTables where the game might be played at process step 514. The game server notifies the game router of the available live game play feed at subsequent process step 516.

At the next process step 518, the game router maps the remote EGM bets or wagers and view requests to the various appropriate game channels in the system. The game server then applies the game rules at step 520, and returns the results the eTable and appropriate EGMs. The game server then notifies the financial clearing house of the game results at process step 522, after which all pending wagers from all player stations local and remote are resolved at step 524. Player accounts are resolved by way of credit or debit at step 526, after which an inquiry is made at decision step 528 as to whether a new game is desired. If so, then the method reverts to process step 508 and the entire process from that point is repeated. If not, then the method ends at end step 530.

Figure 6:
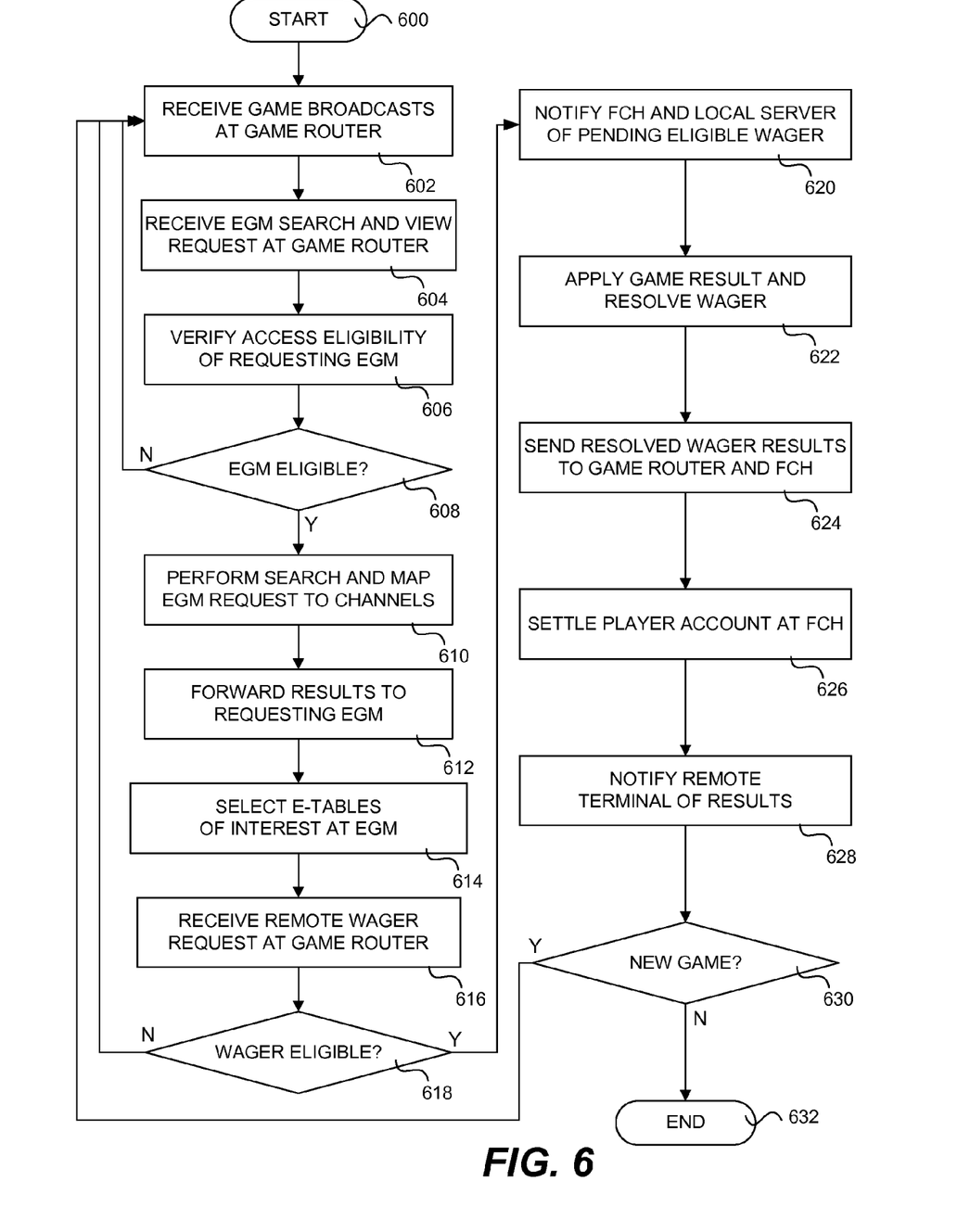
FIG. 6 provides a flowchart of an exemplary method of broadcasting live games from an electronic gaming table across an associated gaming table system according to one embodiment of the present disclosure.

FIG. 6 provides a flowchart of an exemplary method of broadcasting live games from an electronic gaming table across an associated gaming table system. After a start step 600, the game router receives game broadcasts from the various games servers at a first process step 602. At a following process step 604, various search and view requests are received at the game router from different remote player stations, EGMs, remote player terminals and the like. The game router can then verify the network access eligibility of the various requesting EGMs and other devices at a process step 606, after which an inquiry is made at decision step 608 as to whether a particular requesting EGM is eligible. If not, then access is denied and the method reverts to process step 602.

If the EGM (e.g., player station or remote terminal) is eligible though, then the method continues to process step 610, where the game router performs a search and maps the EGM request to matching or appropriate game channels. The results are then sent to the requesting EGM at process step 612, after which a selection of one or more eTables or live table games of interest is made at the EGM at process step 614. A remote wager request is then received at the game router from the requesting EGM at a process step 616, upon which an inquiry is made at decision step 618 to determine whether the wager is eligible for that particular EGM. Wager or bet eligibility can be a function of, for example, EGM location, player ID, local gaming rules, minimum or maximum bet size, funds availability, and the like. If the wager is not eligible, then the method can revert back to process step 602. Alternatively, the method may revert back not as far, such as to step 610 or even step 618 as may be appropriate. For example, a prompt indicating that the wager is not within the minimum and maximum wager limits for that given remote game, along with a prompt to try again, might be more appropriate in some instances.

Where the wager is eligible, then the method continues to process step 620, where the financial clearinghouse ("FCH") and local server are both notified of the pending eligible wager on a relevant remote live table game. The games server can also notify the active EGM of its accepted wager on the remote live game. At a following process step 622 the game result is applied and the wager is resolved. This can be done at the live eTable and/or at the game server that serves that table. The resolved wager results are then sent to the game router and the FCH at process step 624, after which the player account at the FCH is credited, debited or otherwise settled at process step 626. The EGM or other remote terminal is notified of the results at process step 628, which can be done by the game router. An inquiry can then be made at decision step 630 as to whether a new live game is desired. If so, then the method can revert to step 602 and completely repeat. As in the foregoing decision, the method may revert to process step 616 in some cases, such as where the player wishes to remain at the same remote table and game. When no new game is desired at step 630, then the method ends at end step 632.

Figure 7:
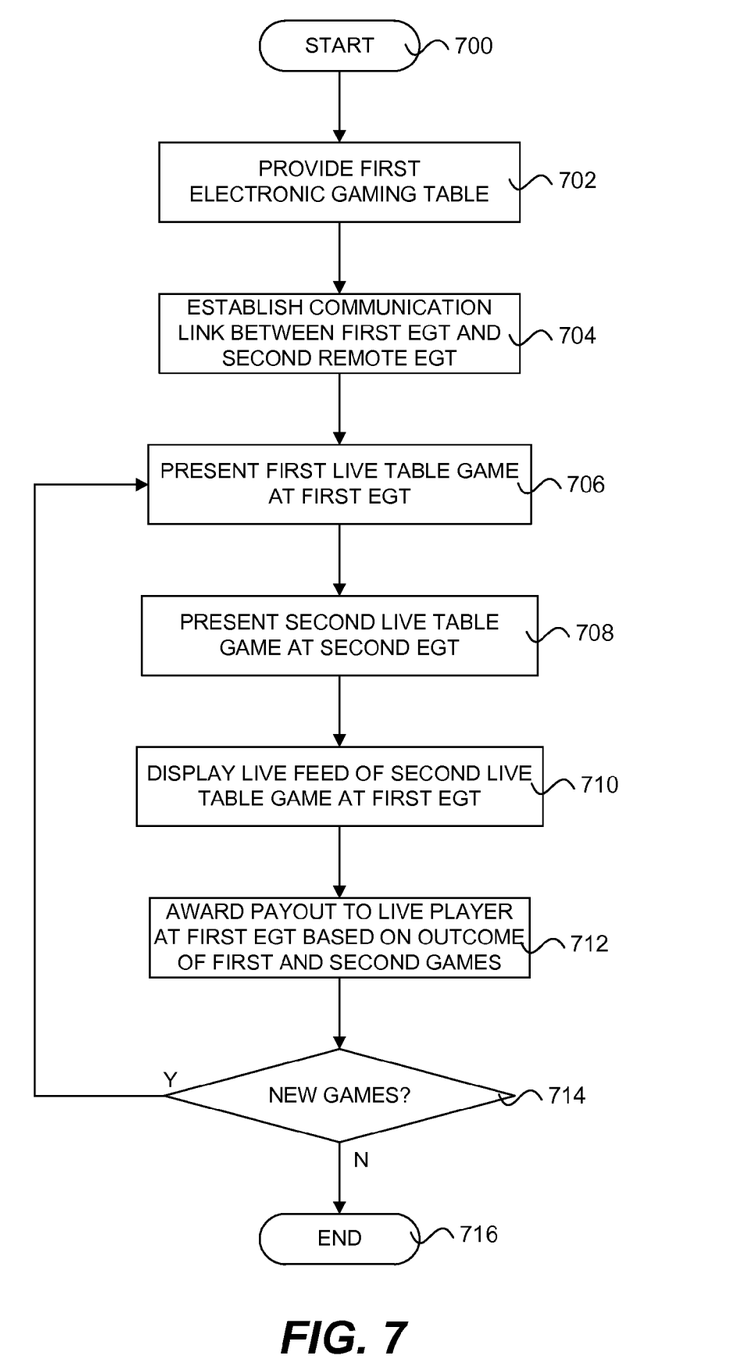
FIG. 7 provides a flowchart of an exemplary method of providing live table games at an electronic gaming table within a gaming table system according to one embodiment of the present disclosure.

FIG. 7 provides a flowchart of an exemplary method of providing live table games at an electronic gaming table within a gaming table system. Starting with a start step 700, a first electronic gaming table or eTable can be provided at process step 702. Such an eTable can be any of the foregoing embodiments or any other suitable device for this method. At a subsequent process step 704, a communication link is established between this first eTable and a second remotely located eTable. At the next process step 706, a first live table game is presented at the first eTable. Next, or alternatively at the same time as step 706, a second live table game is presented at the second remotely located eTable at process step 708. A live feed of the second live table game is presented at the first eTable at process step 710, after which a payout can be awarded to a player at the first eTable at step 712. This payout can be based on the outcome of the first live game, the second live game, or both. At a decision step 714, an inquiry is made as to whether any new or further live table games are desired. If so, then the method can revert to step 706 and repeat. If not, then the method proceeds to end step 716.

For each of the foregoing three flowcharts and methods, it will be readily appreciated that not every method step provided is always necessary, and that further steps not set forth herein may also be included. For example, added steps to involve additional eTables or third or more live table games may be added. Furthermore, the exact order of steps may be altered as desired for various applications, and some steps may be performed simultaneously.

It should be understood that the devices, systems and methods described herein may be adapted and configured to function independently or may also interact with other systems or applications, such as for example, a casino management system or player tracking system. As such, the wagering data may be recorded and stored in connection with player information retrieved from the terminal. It should also be readily apparent that additional computerized or manual systems may also be employed in accordance with the disclosure in order to achieve its full implementation as a system, apparatus or method.

Those skilled in the art will readily appreciate that any of the systems and methods of the disclosure may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as an existing electronic gaming machine, portable computing device or electronic platforms with multiple player positions. In addition, the system of the disclosure may be provided at least in part on a personal computing device, such as home computer, laptop or mobile computing device through an online communication connection or connection with the Internet. Those skilled in the art will further appreciate that the precise types of software and hardware used are not vital to the full implementation of the methods of the disclosure so long as players and operators thereof are provided with useful access thereto or the opportunity to play the game as described herein.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, randomaccess memory, CD-ROMs, DVDs, magnetic tape, optical data storage devices, and carrier waves. The computer readable medium can also be distributed over network-coupled computer systems so that the computer readable code is stored and executed in a distributed fashion.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. An electronic gaming table adapted to host table games involving wagers, table games based on the wagers, and monetary awards based on the result of the table games, the electronic gaming table comprising:
a physical surface adapted for the play of live table games that include the use of a live dealer and physical game components;
a dealer station situated proximate said physical surface and adapted to provide for the presence of a live dealer at the electronic gaming table, wherein the live dealer facilitates the play of said live table games;
a master table controller adapted to control a plurality of electronic gaming table functions; and
at least one interface in communication with said master table controller and adapted for communication with a plurality of separate electronic player terminals remotely located from said electronic gaming table, wherein at least one of said plurality of electronic player terminals is adapted to allow a live player stationed thereat to participate simultaneously and remotely in a first live table game at the electronic gaming table and also a second live table game at a different remotely located electronic gaming table, wherein the first live table game and the second live table game are two different kinds of games such that the second live table game has different game rules than the first live table game, and wherein said at least one electronic player terminal is not located at any gaming table.

2. The electronic gaming table of claim 1, wherein said at least one player terminal is a mobile telephone.

3. The electronic gaming table of claim 1, wherein said at least one player terminal includes a player interface adapted to switch between the first live table game and the second live table game.

4. The electronic gaming table of claim 1, wherein said at least one player terminal is not constrained to play at said electronic gaming table.

5. The electronic gaming table of claim 1, further including:
an electronic shoe in communication with said master table controller and adapted to hold playing cards for the play of a live table game, wherein said electronic shoe is further adapted to read the playing cards and communicate information therefor to said master table controller.

6. The electronic gaming table of claim 1, wherein the physical game components include one or more playing cards.

7. The electronic gaming table of claim 1, wherein said at least one player terminal is adapted to conduct financial transactions between the live player and one or more remotely located network devices.

8. The electronic gaming table of claim 1, wherein said at least one player terminal includes a player interface having both a first set of input options that are specific to the first live table game and a second set of input options that are specific to the second live table game that is a different game type from the first live table game, and wherein both the first and second set of input options are simultaneously available to a player stationed thereat.

9. The electronic gaming table of claim 8, wherein the first set of input options includes touchscreen options for bets on player, dealer, and tie for the game of baccarat, and wherein the second set of input options includes screen buttons for bet, insurance, double down, and split for the game of blackjack.

10. An electronic gaming table system, comprising:
a plurality of electronic gaming tables adapted to host table games involving wagers, table games based on the wagers, and monetary awards based on the result of the table games, wherein at least two of said plurality of electronic gaming tables are located remotely from each other and each includes:
a physical surface adapted for the play of live table games that include the use of a live dealer and physical game components,
a dealer station situated proximate said physical surface and adapted to provide for the presence of a live dealer at the electronic gaming table, wherein the live dealer facilitates the play of said live table games,
a master table controller adapted to control a plurality of electronic gaming table functions, and
at least one interface in communication with said master table controller and adapted for communication with a plurality of separate electronic player terminals located remotely from all gaming tables, wherein at least one of said plurality of electronic player terminals is adapted to allow a live player stationed thereat to participate simultaneously and remotely in a live table game at the electronic gaming table and also another live table game at one of the remaining electronic gaming tables, wherein the live table games have different game rules with respect to each other; and an electronic gaming table host server located remotely from and in communication with said at least two electronic gaming tables, said electronic gaming table host server being adapted to facilitate communications between said at least two electronic gaming tables.

11. The electronic gaming table system of claim 10, wherein said at least one player terminal is a mobile telephone.

12. The electronic gaming table system of claim 10, wherein said at least one player terminal includes a player interface adapted to switch between the live table game and the other live table game.

13. The electronic gaming table system of claim 10, further including:
  at least one electronic shoe in communication with a respective master table controller and adapted to hold playing cards for the play of a live table game, wherein said electronic shoe is further adapted to read the playing cards and communicate information therefor to the master table controller.

14. The electronic gaming table system of claim 10, wherein the physical game components include one or more playing cards.

15. The electronic gaming table of claim 10, wherein said at least one player terminal is adapted to conduct financial transactions between the live player and one or more remotely located network devices.

16. The electronic gaming table system of claim 10, further including:
  a games router in communication with said plurality of electronic gaming tables and a separate remotely located financial clearinghouse, said games router being adapted to:
    receive a search request from the remotely located smart phone,
    match up the search request with one or more of said plurality of electronic gaming tables based upon the search request,
    direct communications between the remotely located smart phone and said one or more of the plurality of gaming tables based upon the search request,
    monitor the remotely located smart phone for a wager,
    verify the eligibility of the remotely located smart phone to make a wager, and
    notify the separate remotely located financial clearinghouse of the wager.

17. A method of providing live table games, comprising:
  providing a first electronic gaming table and a second electronic gaming table, wherein both electronic gaming tables are adapted to host table games involving wagers, table games based on the wagers, and monetary awards based on the results of the table games;
  establishing a communication connection between the first electronic gaming table and a remotely located electronic player terminal that is not located at any gaming table;
  establishing a communication connection between the second electronic gaming table and the remotely located electronic player terminal;
  presenting a first live table game involving a live dealer and physical game components at the first electronic gaming table, wherein a live player located at the remotely located electronic player terminal participates in the first live table game;
  presenting a second live table game involving a live dealer and physical game components at the second electronic gaming table, wherein the second live table game has different game rules than the first live table game, and wherein the live player located at the remotely located electronic player terminal also participates in the second live table game simultaneously with the first live table game;
  displaying a live feed of at least a portion of the second live table game at the remotely located electronic player terminal; and
  awarding a prize or monetary payout to the live player based on the outcome of the first live table game, the second live table game, or both.

18. The method of claim 17, wherein the remotely located player terminal is a smart phone.

* * * * *